Feb. 4, 1941.  H. M. NELLY, JR., ET AL  2,230,467
COMBINED REGENERATOR AND CATALYST CHAMBER
Filed Jan. 27, 1938   2 Sheets-Sheet 1

INVENTORS
Hoyt C. Hottel
Henry M. Nelly, Jr.
BY Thos. E. Scofield
ATTORNEY

Feb. 4, 1941. H. M. NELLY, JR., ET AL 2,230,467
COMBINED REGENERATOR AND CATALYST CHAMBER
Filed Jan. 27, 1938 2 Sheets-Sheet 2

INVENTORS
Hoyt C. Hottel
Henry M. Nelly, Jr.
BY
ATTORNEY

Patented Feb. 4, 1941

2,230,467

UNITED STATES PATENT OFFICE 2,230,467

COMBINED REGENERATOR AND CATALYST CHAMBER

Henry M. Nelly, Jr., Jersey City, N. J., and Hoyt C. Hottel, Belmont, Mass., assignors to The M. W. Kellogg Company, New York, N. Y., a corporation of Delaware Application January 27, 1938, Serial No. 187,196

10 Claims. (Cl. 23—288)

Our invention relates to a combined regenerator and catalyst chamber, and more particularly to apparatus adapted to be used for the production of synthesis gas for use in various processes of synthesizing organic compounds.

A mixture of carbon monoxide and hydrogen may be made from natural gas (methane) and carbon dioxide according to the following reaction:

$$CH_4 + CO_2 \rightarrow 2CO + 2H_2 - x \text{ calories}$$

It will be noted that the above reaction is endothermic, i. e., that heat must be supplied. The reaction will take place in the presence of a catalyst at temperatures above 1500° F. and 2000° F.

The catalyst may comprise nickel deposited on clays of high alumina content, such as fire clay or alundum.

It is to be understood that our regenerator and catalyst chamber may be employed generally whenever an endothermic reaction is required to be carried out in the presence of a catalyst.

One object of our invention is to provide a novel regenerator and catalyst chamber.

Another object of our invention is to provide a combined regenerator and catalyst chamber which will enable endothermic reactions in the presence of a catalyst to be conveniently carried out.

Another object of our invention is to provide a combined regenerator and catalyst chamber in which the synthesis gas mixture being withdrawn therefrom will automatically be maintained within a desired temperature range.

Other and further objects of our invention will appear from the following description.

In the accompanying drawings which form part of the instant specification and are to be read in conjunction therewith, and in which like reference numerals are used to indicate like parts in the various views.

Figure 1:
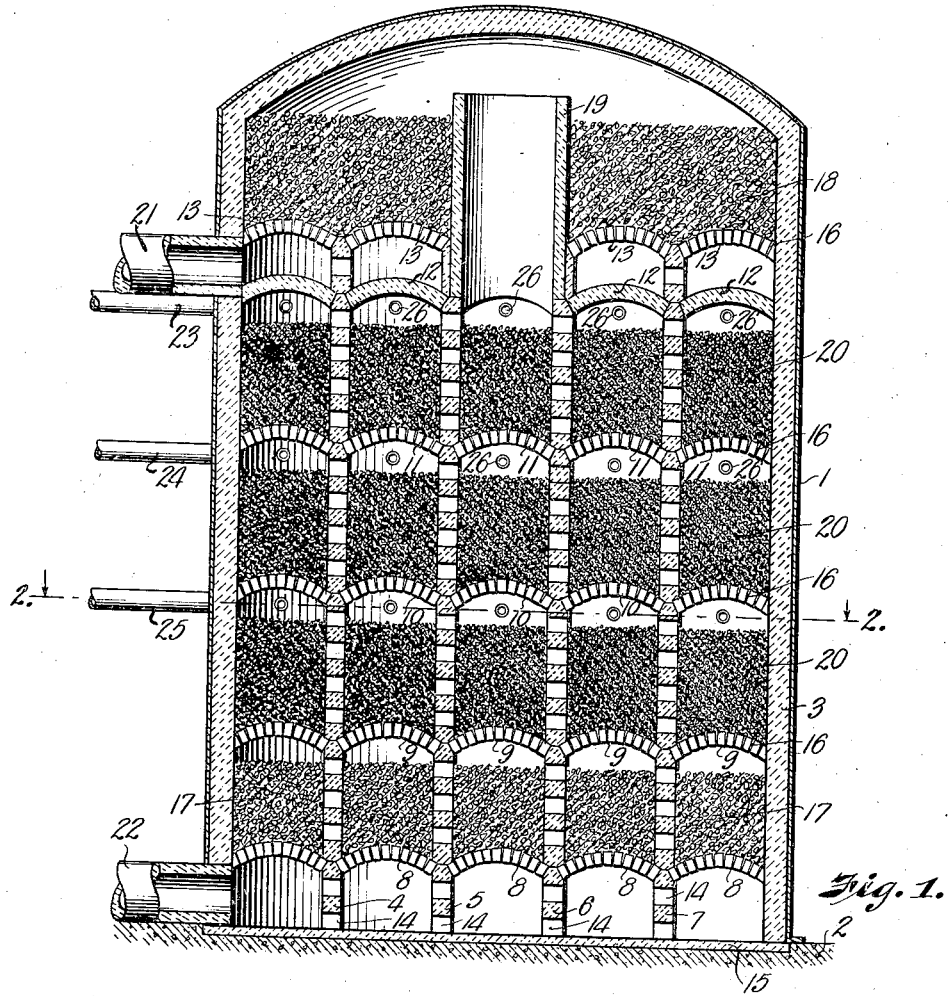
Fig. 1 is a sectional elevation of a regenerator and catalyst chamber showing one embodiment of our invention.
Figure 2:
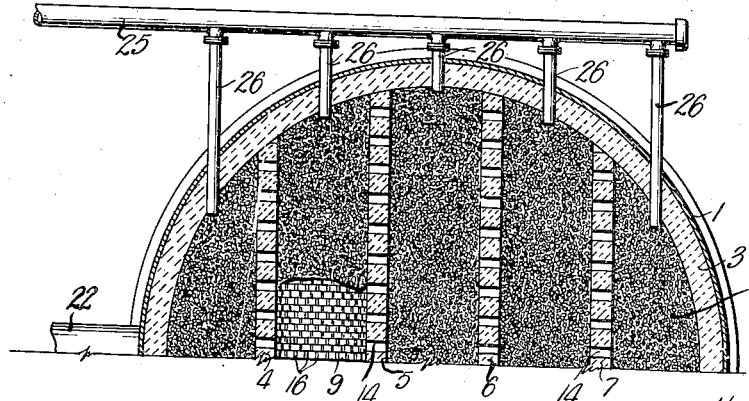
Fig. 2 is a sectional view taken on the line 2—2, Fig. 1.

Referring now to the drawings, a cylindrical steel shell 1 may be formed in any suitable manner, mounted upon any suitable foundation 2. The interior of the steel shell is lined with refractory material such as fire brick, and a floor 15 of refractory material. A plurality of walls 4, 5, 6 and 7 are housed within the casing 1, and support arches 8, 9, 10, 11, 12 and 13, as can readily be seen by reference to the drawings. The walls 4, 5, 6 and 7 are provided with interstices or passages 14 which permit horizontal flow of gases therethrough. The arches 8, 9, 10, 11 and 13 are made of refractory material such as fire brick, and provided with interstices 16, permitting vertical flow of gases therethrough.

The arches 12 likewise are made of refractory material but are imperforate.

A flue 19 of refractory material provides communication between the spaces within the chamber on opposite sides of the imperforate arches 12.

Supported by arches 8 are masses of refractory material such as crushed fire brick 17. A mass of crushed fire brick 18 is supported by arches 13, the flue 19 extending through this mass of crushed fire brick.

Supported by arches 9, 10 and 11 are catalyst masses 20. These may comprise crushed refractory material such as fire brick upon which has been deposited the catalyst employed in the particular reaction for which the chamber is to be used.

Extending into the housing 1 above the imperforate floor formed by arches 12, is a duct 21 made of refractory material. Extending into the interior of the chamber adjacent the lower portion thereof is a duct 22 made of refractory material. Manifolds 23, 24 and 25 are provided with a plurality of pipes 26, which extend into the chamber at a plurality of separated places therein.

In operation, air is introduced through duct 21 flowing upwardly through the interstices in arches 13, through the bed of refractory material 18, downwardly through flue 19 from which it is disseminated throughout the catalyst masses 20, flowing downwardly therethrough. Fuel gas is introduced into manifolds 23, 24 and 25 for combustion throughout the catalyst masses 20, the air being supplied through duct 21 supporting the combustion. The hot gases of combustion pass downwardly through refractory masses 17 and thence out through duct 22 to the flue. The distribution of the fuel inlets 26 is such that the fuel is disseminated throughout the catalyst masses, thus preventing local overheating and the entire mass is evenly heated to the desired temperature depending upon the particular reaction to be carried on after the heating cycle is completed.

It will be further noted that the incoming air passes through the uppermost refractory mass 18, thus cooling this mass and being itself heated before combining with the fuel gas in combustion.

It will be noted that heat will be stored in the refractory mass 17. Taking by way of example, the formation of synthesis gas from methane and carbon dioxide, the heating cycle is continued until the catalyst masses 20 and the top of the regenerator masses 17 become heated to a temperature between 1800° F. and 2200° F.

During the make cycle a mixture of carbon dioxide and methane is introduced through duct 22. The mixture will flow through the hot refractory beds 17 and be brought to reaction temperature, simultaneously cooling the refractory. Heat for the reaction is also furnished from the heated catalyst masses 20. The hot synthesis gas after being formed passes upwardly through flue 19, and downwardly through refractory mass 18. Refractory mass 18 will thus be heated, and the freshly synthesized synthesis gas will be cooled and flow outwardly through duct 21 for further treatment, depending upon the particular organic products to be made therefrom.

The make cycle is contained until the temperature of the catalyst mass drops to about 1500° F. when the regenerator and catalyst chamber is again subjected to the heating cycle. Between the make cycle and the heating cycle, if desired, the catalyst chamber may be purged of oxygen by means of an inert gas such as carbon dioxide in order to reduce an explosion hazard, which might exist if air be introduced into a highly heated mixture of carbon monoxide and hydrogen.

It will be observed that our arrangement makes for maximum thermal efficiency. It is desirable to cool the synthesis gas as the synthesis reactions in which it is employed do not require as high temperature as is necessary to form it. The heat employed in cooling the freshly made synthesis gas is recovered in preheating the air for combustion of the fuel gas during the heating cycle. The heat of the combustion gases during the heating cycle is partially recovered, not only through the medium of the catalyst masses 20, but also by the regenerator masses 17, this heat being later employed to preheat the mixture of carbon dioxide and methane during the make cycle.

By combining the regenerative or heat-storage function of the crushed refractory with the catalytic plus heat-storage function of the catalyst and with a superimposed and controlled heat liberation during the air blow, it is possible to design for a desired temperature distribution (or a desired degree of uniformity of temperature) simultaneously with a desired thermal efficiency. Furthermore, it is possible after the unit has been put into operation, to correct operation of the unit to its optimum. For example, the introduction of fuel gas only into the top combustion section 26 (feasible without overheating the catalyst during the early part of a run) will act to make the three tiers below serve as regenerators and to improve the thermal efficiency.

In the case of a cheap catalyst mass which would serve equally well as regenerator packing, the regenerative and catalytic portions of the unit may be filled with the same materials. The supply of heat, such as by combustion of fuel gas, to the center section or sections of the unit will then be the sole feature distinguishing the catalytic section from the regenerative sections on either side of it, and the function of packing material below the last point of entry of fuel will vary from catalysis and heat storage to heat storage alone, in proportions automatically determined by proportions and duty of the equipment.

Figures 3, 4:
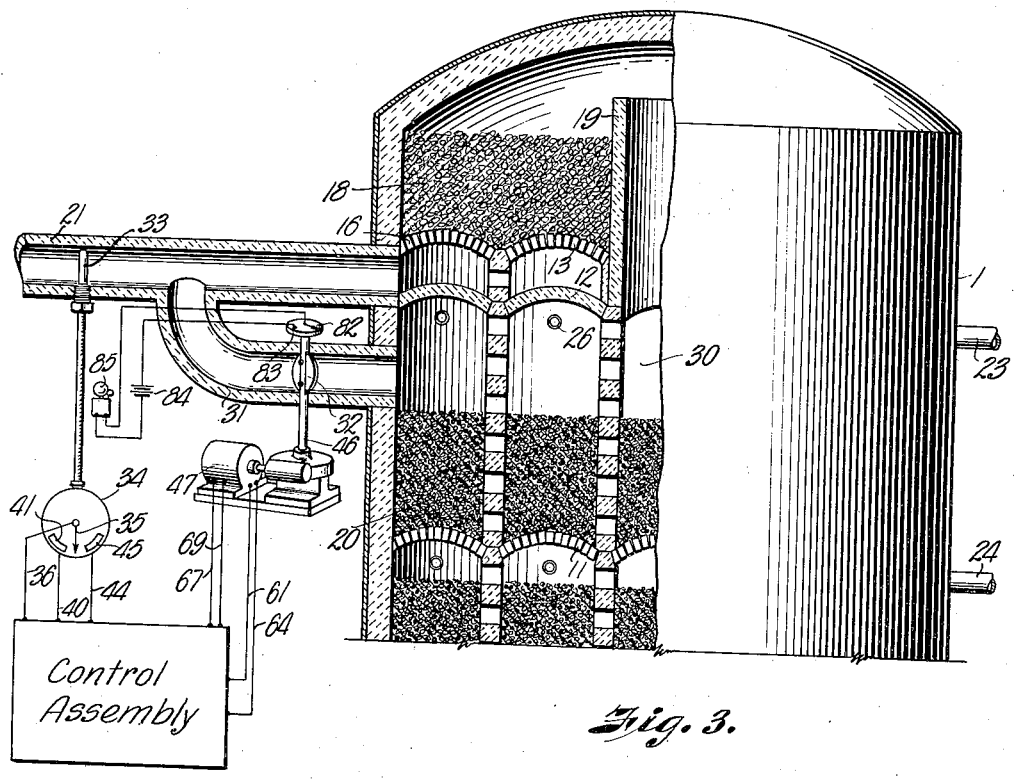
Fig. 3 is a sectional elevation of a regenerator and catalyst chamber, with parts in section, equipped with a control means for automatically maintaining the temperature of the material leaving the catalyst chamber between desired temperature limits.
Fig. 4 is a diagrammatic view of the control assembly employed in the embodiment shown in Fig. 3.

Referring now to Fig. 3, communicating with the space 30 above the uppermost catalyst bed 20, we provide a withdrawal conduit 31 provided with a control damper 32. The conduit 31 acts to by-pass the regenerator bed 18. As will readily be observed by reference to Fig. 3, when the damper 32 is opened, the freshly formed hot synthesis gas mixture may flow directly into eduction conduit 21 through by-pass duct 31, instead of following the path of greater resistance upwardly through flue 19 and downwardly through refractory bed 18.

When the catalyst and regenerator chamber is first placed on the make cycle, the refractory bed 18, having been cooled to its minimum temperature by the air just used to support combustion during the heating step, may cool the freshly made synthesis gas formed during the make cycle to a temperature below that which is desirable for the synthesizing process to which the synthesis gas is being put. In this case it is desirable to by-pass a portion of the synthesis gas being made directly into the eduction conduit for admixture with that portion of the synthesis gas which has passed through the regenerator bed 18 in order that the temperature of the mixture be raised to the desired point. When the catalyst and regenerator chamber is first placed on the make cycle, the catalyst beds and lower regenerator bed 17 are heated to their highest temperature. As the make cycle progresses there is a gradual drop in temperature of the synthesis gas as it leaves catalyst beds 20. At the same time there is a progressive rise in temperature of that part of the gas leaving the generator bed 18. It is therefore necessary to regulate the proportion of the gas by-passed around beds 18 to maintain a constant temperature of the exit gases. If the rate of temperature drop from catalyst beds 20 is less than the rate of the rise of temperature from beds 18, a greater proportion of the gases must be by-passed as the cycle progresses.

In general it will be apparent that if the synthesis gas leaving the catalyst and regenerator chamber through eduction conduit 21 is too hot, damper 32 should be closed in order that a greater portion of the synthesis gas be constrained to pass through the synthesis gas cooling regenerator bed 18. On the other hand, if the temperature of the synthesis gas leaving the catalyst regenerator chamber through eduction conduit 21 is below the desired temperature, the damper should be opened in order to by-pass the cooling bed. As the synthesis gas make cycle progresses the temperature of the catalyst beds 21 and the temperature of the regenerator bed 18 will tend to approach each other. It will be obvious, of course, that the temperature of regenerator bed 18 will never in practice reach the temperature of the catalyst beds because before this condition can take place, the catalyst beds will have cooled to a point below that necessary to continue the synthesis gas make efficiently.

In order to assure an output of synthesis gas at the desired temperature, and to compensate for variations in the flow rate and yet maintain the desired eduction temperature for the freshly made synthesis gas, we provide an automatic control for damper 32, that is, we adjust the damper 32 in response to a function of the temperature of the eduction synthesis gas in order that the mixture of the synthesis gas passed through the cooling bed 18 and the by-passed synthesis gas will be maintained within the desired temperature range or substantially at the desired temperature.

A pyrometer 33 may be of any suitable type, such as an electrical pyrometer, adapted to register temperature on a galvanometer 34, in the case of an electrical pyrometer. It is to be understood, of course, that any suitable pyrometer may be employed. The registering needle 35 is made of a conducting material and connected by conductor 36 to one terminal of a battery 37. The other terminal of the battery is connected through conductor 39, coil 38 and conductor 40 to a contact point 41, and through conductor 42, coil 43 and conductor 44 to a contact point 45. The contact points may be set at respective upper and lower temperatures between which it is desired to maintain the eduction synthesis gas. Contact point 41 is set at the lower temperature and contact point 45 is set at the higher temperature.

The damper 32 is adapted to be operated through a control shaft 46 through an electric motor 47. When the temperature of the eduction synthesis gas drops to the lower point of the desired temperature range, the registering needle 35 will make contact with contact point 41 thus completing a circuit through battery 37 and coil 38. The energization of coil 38 will attract the armature 48 causing contact plate 49 to electrically connect contact point 50 and contact point 51, and contact plate 52 to electrically connect contact point 53 and contact point 54. When this occurs current will flow from one terminal 55 of the battery 56 through conductor 58 through conductor 59 to contact point 50 through contact plate 49 to contact point 51, through conductor 60 through conductor 61 to one brush 62 of the motor 47, returning to the other terminal of the battery through brush 63, conductor 64, conductor 65, contact point 54, contact plate 52, contact point 53, conductor 66, conductor 67, field winding 68 of the motor, conductor 69, to terminal 70 of battery 56.

The motor will run to open the damper 32 to permit the freshly formed synthesis gas to flow through by-pass duct 31, by-passing the cooling regenerator bed 18. As soon as the damper 32 is opened or moved to a further open position than that which it previously occupied, a greater volume of hot synthesis gas will be admixed with the gases passing the pyrometer 33, the registering needle will move away from contact point 41 and break the circuit through coil 38 opening both the field circuit and armature circuit of the motor 47, stopping the damper in the position set. Should the damper have opened to too great an extent the temperature of the eduction gases will be such that registering needle 35 will make contact with contact strip 45, thus closing a circuit through battery 37 and coil 43, attracting armature 71 and causing contact plate 72 to close a circuit through contact points 73 and 74, and causing contact plate 75 to electrically connect contact point 76 and contact point 77. When this occurs current will flow from terminal 55 of battery 56 through conductor 58 through conductor 78 through contact point 77, contact plate 75, contact point 76, conductor 79, conductor 64, to brush 63, current returning to the battery through brush 62, conductor 61, conductor 80, contact point 73, contact strip 72, contact point 74, conductor 81, conductor 67, field winding 68, conductor 69, to the other terminal 70 of the battery 56.

It will be observed that when coil 43 is energized the direction of armature current of motor 47 with respect to the field current is opposite to its direction with respect to the field current when coil 38 is energized. The reversal of armature current with respect to field current will reverse the direction of rotation of the motor 47, thus tending to close the damper.

After the damper closes, a greater proportion of cooled synthesis gas will be admixed with the synthesis gas passing pyrometer 33. The resultant reduced temperature will cause registering pointer 35 to break contact with contact strip 45 thus breaking the circuit through relay coil 43 permitting the armature 71 of the relay to drop breaking the motor circuit through motor 47.

It will be apparent that we have provided means for controlling the temperature of the eduction material from the synthesis regenerator chamber as the function of the eduction gas. A pointer 82 is secured to control shaft 46 and is adapted to rotate therewith to indicate the position of the damper 32. When the damper 32 is moved to fully open position, pointer 82 will make contact with contact point 83 completing a circuit through battery 84 and indicating signal, such as a bell, 85. The bell 85 may be placed on a control panel or at any suitable point and will indicate that it is necessary to take the catalyst regenerator chamber off the make cycle and to again reheat the catalyst beds.

It will be observed that we have accomplished the objects of our invention, and have provided an efficient regenerator and catalyst chamber in which endothermic catalytic reactions may be conveniently and efficiently carried out. We control the temperature of the eduction material automatically between predetermined limits. It is to be understood that our catalyst and regenerator chamber may be used in other catalytic reactions and that our illustration of the making of synthesis gas is by way of example and not by way of limitation.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A regenerator and catalyst chamber adapted to be operated on make and regenerative cycles comprising an insulated shell, perforated supports in the shell for carrying refractory and catalytic material, flues connected to the upper and lower portions of the shell for introducing and exhausting gas to be treated, said catalytic and refractory material being arranged so that gas introduced to the shell passes first through refractory material, thence through catalytic material and finally through a separate layer of refractory material before being exhausted, and separate means for introducing gaseous material to portions of the shell containing the catalytic material whereby gaseous material may be introduced directly to the catalytic material as well as through the refractory material to the catalytic material.

2. A regenerator and catalyst chamber adapted to be operated on make and regenerative cycles comprising an insulated shell, perforated supports carrying refractory and catalytic material in the shell, flues connected to the upper and lower portions of the shell for introducing and exhausting gas to be treated, said catalytic and refractory material being arranged so that gaseous material introduced to the shell through the flues passes first through refractory material, thence through catalytic material and finally through a separate zone of refractory material before being exhausted, and separate means for introducing gaseous material at a plurality of points directly into the catalytic material.

3. A regenerator and catalyst chamber adapted to be operated on make and regenerative cycles comprising an insulated shell, a plurality of perforated supports carrying refractory and catalytic material in the shell, flues connected to the upper and lower portions of the shell for introducing and exhausting gases to be treated, said catalytic and refractory material arranged in beds so that gases introduced to the shell pass first through refractory material, thence through catalytic material and finally through refractory material before being exhausted, and a plurality of separate means for introducing gaseous material directly to the catalytic material at different heights on the shell whereby gaseous material introduced therethrough is more uniformly distributed throughout the catalytic material.

4. A regenerator and catalyst chamber adapted to be operated on make and regenerative cycles comprising an insulated shell, a plurality of perforated supports carrying refractory and catalytic material in the shell, flues connected to the upper and lower portions of the shell for introducing and exhausting gases to be treated, said catalytic and refractory material arranged in beds so that gas introduced to the shell during the "make" passes first through refractory material, thence through catalytic material and finally through refractory material before being exhausted, a plurality of separate means for introducing gaseous material, during the regenerative part of the cycle, directly to various portions of the shell containing the catalytic material, and means for simultaneously introducing gaseous material through the refractory material to the catalytic material.

5. A regenerator and catalyst chamber adapted to be operated on make and regenerative cycles comprising an insulated shell, a plurality of perforated supports carrying refractory and catalytic material in the shell, flues connected to the upper and lower portions of the shell for introducing and exhausting gases to be treated, said catalytic and refractory material arranged in beds so that gas introduced to the shell during the "make" passes first through refractory material, thence through catalytic material and finally through refractory material before being exhausted, a plurality of separate means for introducing gaseous fuel during the regenerative part of the cycle directly to various portions of the shell containing the catalytic material, and means for simultaneously introducing air through the refractory material to the catalytic material.

6. A regenerator and catalyst chamber including in combination a shell, a bed of catalytic material supported within said shell, a bed of refractory material supported in said shell in spaced relation to said catalytic bed, means for heating said catalytic bed, means for passing material to be acted upon through said catalytic bed, through said refractory bed, to be withdrawn from said shell, and means for by-passing said refractory bed.

7. A regenerator and catalyst chamber including in combination a shell, a bed of catalytic material supported within said shell, a bed of refractory material supported in said shell in spaced relation to said catalytic bed, means for heating said catalytic bed, means for passing material to be acted upon through said catalytic bed, through said refractory bed, to be withdrawn from said shell, means for by-passing said refractory bed, and means for controlling said by-passing means as a function of the eduction temperature of the material leaving said shell.

8. In an assembly for conducting catalytic reactions, a mass of catalysts, a mass of refractory material, means for heating said catalyst mass, means for passing the material to be acted upon through said catalyst mass and then through said refractory mass, means for by-passing said refractory mass, a control means for said by-passing means, and means for operating said control means in response to the temperature of the material being withdrawn from the assembly.

9. A regenerator and catalyst chamber adapted to be operated on make and regenerative cycles comprising an insulated shell, perforated supports carrying individual beds of refractory and catalytic material within the shell and each support having a gas distributing space thereunder free of solid material, flues connected to the upper and lower portions of the shell for introducing and exhausting gas to be treated, said catalytic and refractory beds being arranged so that gaseous material introduced to the shell through the flues passes first through a bed of refractory material, thence through beds of catalytic material and finally through a separate zone of refractory material before being exhausted, and separate means for introducing gaseous fuel into a plurality of said gas distributing spaces beneath said supports.

10. A regenerator and catalyst chamber adapted to be operated on make and regenerative cycles comprising an insulated shell, flues connected to the upper and lower portions of the shell for introducing and exhausting gases to be treated, catalytic and refractory material arranged in beds in said shell so that gas introduced to the shell during the "make" cycle passes first through refractory material, thence through catalytic material and finally through refractory material before being exhausted, a perforated arched member supporting each of said beds of catalytic material at spaced vertical intervals and each having a gas distributing space thereunder free of solid material, a separate means for introducing gaseous fuel during the regenerative cycle directly to the various portions of the shell adjacent to each of said gas distributing spaces, and means for simultaneously introducing air through the refractory material to the catalytic material.

HENRY M. NELLY, JR.
HOYT C. HOTTEL.